(12) United States Patent
Bartolutti et al.

(10) Patent No.: US 6,766,022 B1
(45) Date of Patent: Jul. 20, 2004

(54) SYSTEM FOR PROVIDING UNIVERSAL CROSS-CONNECT CONNECTIVITY IN A CENTRAL OFFICE

(75) Inventors: Steven C. Bartolutti, Suwanne, GA (US); Leslie A. Baxter, Little Silver, NJ (US); Jane B. Clayton, Suwanee, GA (US); Clay A. Feustel, Lawrenceville, GA (US); Harold W. Friesen, Dunwoody, GA (US); David R. Hawkins, Sugar Hill, GA (US); Christopher M. Helmstetter, Bridgewater, NJ (US); Ian A. White, Dunwoody, GA (US)

(73) Assignee: Avaya Technology Corp., Basking Ridge, NJ (US)

( * ) Notice: Subject to any disclaimer, the term of this patent is extended or adjusted under 35 U.S.C. 154(b) by 722 days.

(21) Appl. No.: 09/664,243

(22) Filed: Sep. 18, 2000

(51) Int. Cl.[7] .............................................. H04M 9/00

(52) U.S. Cl. ............................ 379/413.02; 379/413.03; 379/413.04

(58) Field of Search .................................. 379/326, 291, 379/292, 306, 335, 399.01, 399.02, 413.04, 327, 339, 345, 413.02, 413.03; 361/733; 439/49, 534, 540.1; 370/200; 710/317

(56) References Cited

U.S. PATENT DOCUMENTS

| | | | | |
|---|---|---|---|---|
| 5,265,156 A | * | 11/1993 | Eason et al. | ................. 379/327 |
| 5,596,730 A | * | 1/1997 | Sekine | ....................... 710/317 |
| 5,647,763 A | * | 7/1997 | Arnold et al. | ........... 439/540.1 |
| 5,737,309 A | * | 4/1998 | Ewell et al. | ................. 370/200 |

* cited by examiner

Primary Examiner—Bing Q. Bui
(74) Attorney, Agent, or Firm—Thomas, Kayden, Horstemeyer & Risley, LLP (57) ABSTRACT

A system for cross-connecting network elements of different types through a common universal media. In the system, a media conversion interface is electrically connected to a network element. This media conversion interface passively maps the connector and cable type of the network element to a universal connector type. This media conversion interface is electrically connected to a cross-connect module in a universal distribution frame. This electrical connection uses a universal cable group and universal connectors. This cross-connect module is connected to another cross-connect module, also in a universal distribution frame, using a universal cable group and universal connectors. This second cross-connect module is electrically connected to a second media conversion interface, using a universal cable group and universal connectors. This second media conversion interface is electrically connected to a second network element, and passively maps the connector and cable type of the second network element to the universal connector.

24 Claims, 9 Drawing Sheets

SYSTEM FOR PROVIDING UNIVERSAL CROSS-CONNECT CONNECTIVITY IN A CENTRAL OFFICE

TECHNICAL FIELD OF THE INVENTION

The present invention is generally related to cabling between telecommunications equipment and, more particularly, to a system for providing universal cross-connect connectivity in a Central Office.

BACKGROUND OF THE INVENTION

Telecommunications switching centers are the critical hubs at which all signals transported to the Central Office for distribution to the subscribers whose access to the network is through this office, or to other offices, are broken down to the constituent destinations and then repackaged to their destinations. Because of differing requirements regarding the sequential nature of signals and reliability of the network, signals from the PSTN, CATV and ISPs generally are switched and handled separately. This has led to three distinct logical networks having to be built and supported.

The physical infrastructure of the switches and the media that interconnects the equipment that does the switching are also different. In the traditional Public Switched Telephone Network (PSTN), communications equipment, such as multiplexers and lightwave terminals, is installed in standard network bays. This equipment is cabled using several different types of media (e.g., unshielded twisted pair, shielded twisted pair, coaxial, and fiber) to an appropriate distribution frame for connection to another piece of communications equipment.

PSTN distribution frames are defined by the type of signal (analog or digital), the rate of the signal, and the physical media used to carry the signal within the office. These distribution frames all use standard interfaces which have been developed to support evolving applications. An MDF frame distributes analog voice signals (300–4000 Hz) using wire-wrap or insulation displacement connectors. A DSX-1 frame distributes DSX-1 signals (digital, 1.544 Mb/s) using wire-wrap, bantam or 800-type connectors. A DSX-3 frame distributes DS-3 or STS-1 signals (digital, 44.736 or 51.84 Mb/s) using BNC, 358-type or 440-type connectors.

A different type of distribution frame is used for packet-based signals such as ATM, Frame Relay, and IP. This distribution frame has its own associated cable media (typically UTP) and associated standard interfaces (8-pin modular or insulation displacement connectors), different than those used by the PSTN distribution frames.

The general consensus among telephony experts is that the current circuit-based PSTN network will migrate to, and eventually be replaced by, a packet-based network. In such a network, signals from different applications and providers will no longer be separated and directed to different switching systems. This provides a huge potential saving in reduced infrastructure and operations costs. However, as the PSTN network migrates to an all packet-based network, an infrastructure must continually be built that supports both packet-switched and circuit-switched network elements. Because each type of network element has different cabling requirements, this migration period is very expensive.

SUMMARY OF THE INVENTION

The present invention provides a system for cross-connecting network elements of different types through a common universal media.

Briefly described, the system can be implemented as follows. A media conversion interface is electrically connected to a network element. This media conversion interface passively maps the connector and cable type of the network element to a universal connector type. This media conversion interface is electrically connected to a cross-connect module in a universal distribution frame. This electrical connection uses a universal cable group and universal connectors.

This cross-connect module is connected to another cross-connect module, also in a universal distribution frame, using a universal cable group and universal connectors. This second cross-connect module is electrically connected to a second media conversion interface, using a universal cable group and universal connectors. This second media conversion interface is electrically connected to a second network element, and passively maps the connector and cable type of the second network element to the universal connector.

An advantage of the present invention is that it allows its potential users a smooth upward migration path from current circuit-switched network elements to faster and more efficient packet-based network elements without having to re-cable or change out/replace the units at the cross-connect type at the distribution frame.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several figures.

DETAILED DESCRIPTION OF THE INVENTION

Figure 1:
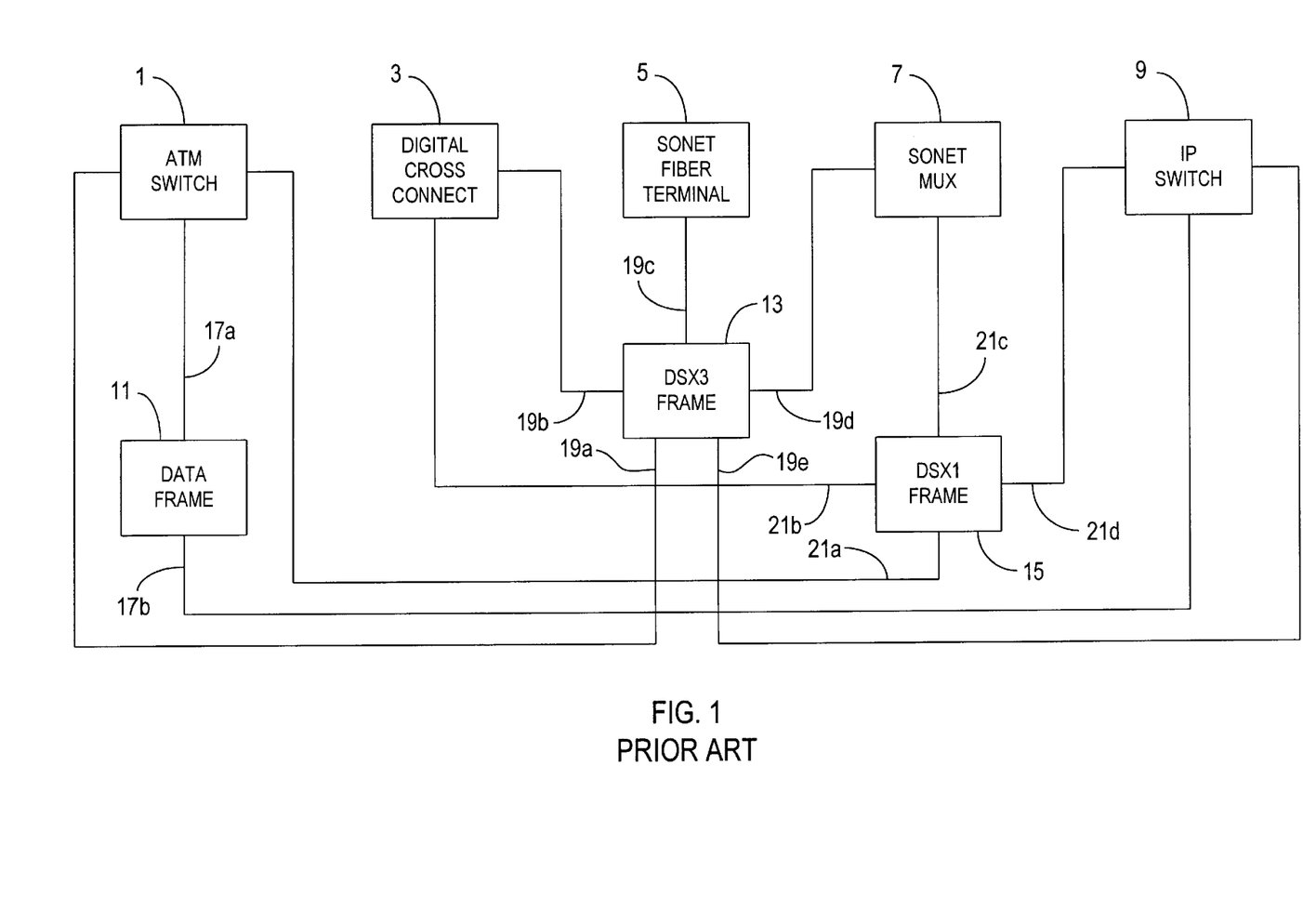
FIG. 1 is a diagram of a conventional Central Office cabling system.

FIG. 1 shows a Central Office cable system using prior art. The Central Office includes various network elements: an ATM switch 1, a digital cross connect 3, a SONET fiber terminal 5, a SONET multiplexer 7, and an IP switch 9. The office also includes various distribution frames: a data frame 11, a DSX3 frame 13 and a DSX1 frame 15. Data traffic, carried by the ATM switch 1 and IP switch 9, is sent to the data frame 11 over unshielded twisted pair (UTP) cabling 17a and 17b. DS3 traffic, carried by network elements 1, 3, 5, 7 and 9, is sent to the DSX3 frame 13 over coax cabling 19a, 19b, 19c, 19d, and 19e. DS1 traffic, carried by network elements 1, 3, 7 and 9, is sent to the DSX1 frame 15 over shielded twisted pair (STP) cabling 21a, 21b, 21c and 21d.

Each distribution frame provides the capability to tie together (cross-connect) any two terminations of like signal rate and format from individual network elements. Thus, any two terminations on the data frame can be tied together to create a live circuit. Similarly, any two terminations on the DSX3 frame can be tied together, and any terminations on the DSX1 frame can be tied together.

Figure 2:
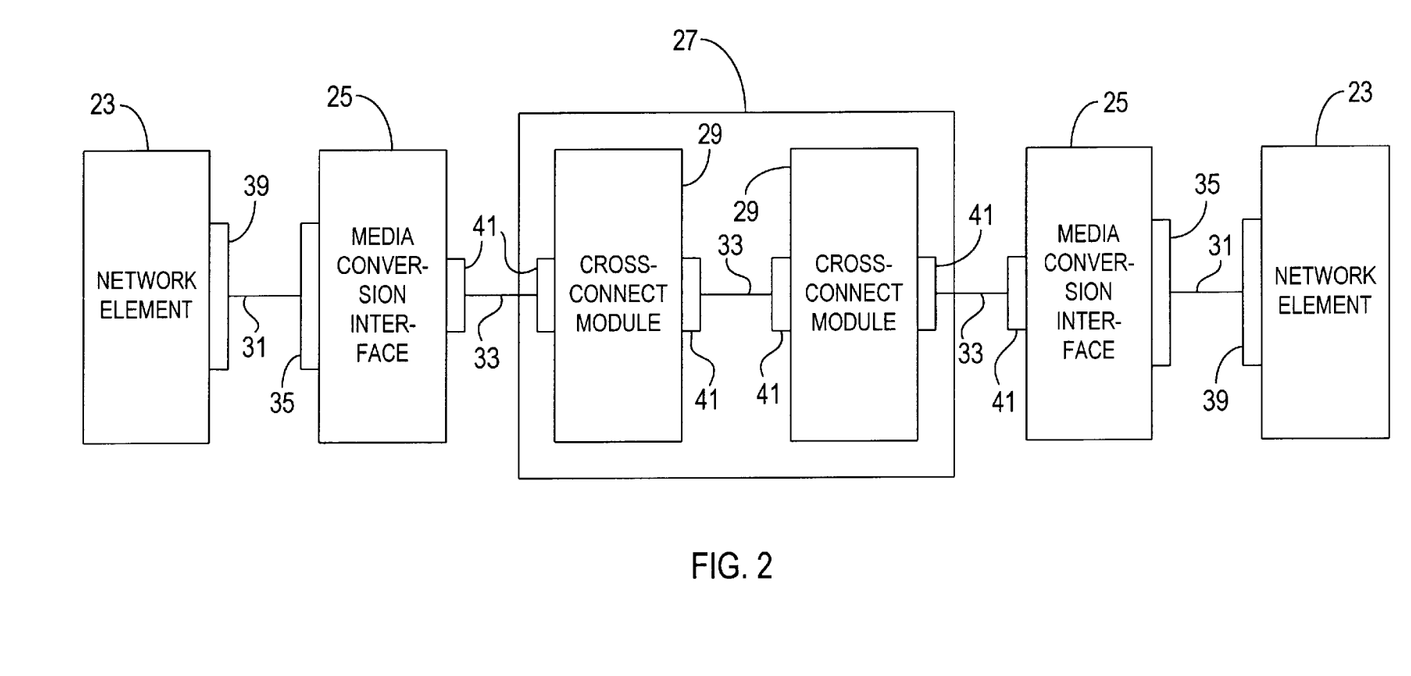
FIG. 2 is a block diagram of an embodiment of the present invention.

FIG. 2 shows an embodiment of the system of the present invention, which comprises: one or more network elements 23; one or more media conversion interfaces 25 associated with each network element 23; and a universal distribution frame 27 comprising two or more cross-connect modules 29. Each network element is electrically connected, or otherwise coupled, by a cable group 31 to one or more associated media conversion interfaces 25. Each media conversion interface 25 is coupled by a universal media cable group 33 to a cross-connect module 29 in the universal distribution frame 27. Each cross-connect module 29 is coupled by a universal media cable group 33 (with or without connectorization) to another cross-connect module 29. The characteristics of the universal media cable group 33 are such that any circuit formed at the universal distribution frame 27 meets the established transmission standards (cross-talk, insertion loss, return loss) for any defined signal and rate format in use by the network elements in the Central Office. In the preferred embodiment, Category 6 unshielded twisted pair is used for the universal media cable group 33.

The type of the network-side connector 35 on the media conversion interface 25 matches the type of the associated network element connector 39. The type of the cross-connect-side connector 41 on the media conversion interface 25 is independent of the type of the associated network element connector 39, and is always the same as the type of the universal media connector 41 used in the universal distribution frame 27. The preferred embodiment of this universal media connector 41 is an insulation displacement connector. The media conversion interface 25 passively maps the pin-out of the network-side connector 35 to the pin-out of the universal media connector 41.

Figure 3:
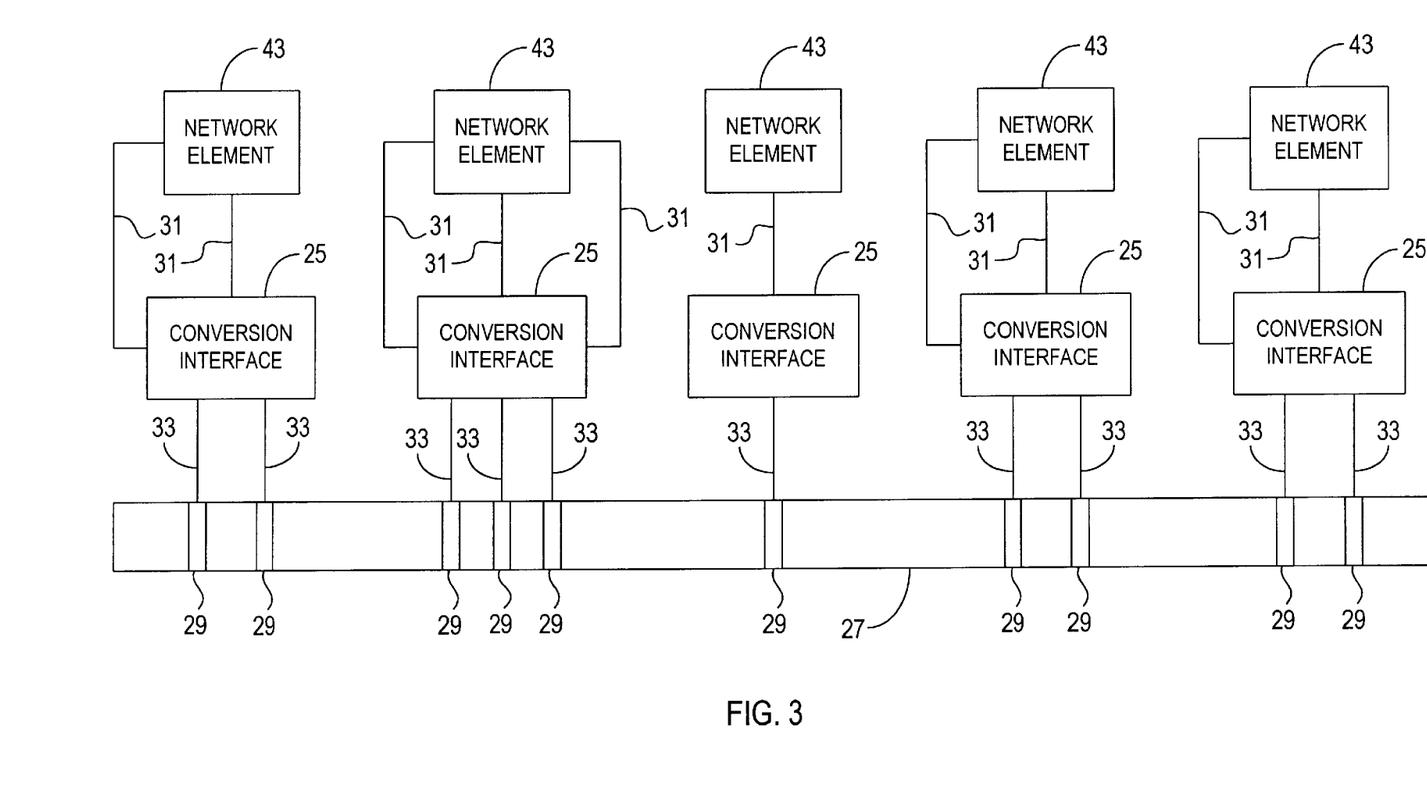
FIG. 3 is a diagram of a Central Office cabling system using an embodiment of the present invention.

FIG. 3 shows a Central Office cable system using an embodiment of the apparatus of the present invention. The Central Office includes various network elements 23. The office also includes a media conversion interface 25 for each network element, and two or more cross-connect modules 29 housed in a universal distribution frame 27. Each media conversion interface 25 is electrically connected by a cable group 31 to its associated network element 43, and electrically connected by a universal media cable group 33 to a cross-connect module 29 in the universal distribution frame 27. Alternative embodiments of cable group 31 may include coax, UTP, STP or optical fiber.

The universal distribution frame 27 provides the capability to tie together (cross-connect) any two terminations of like signal rate and format from individual network elements 23. The universal distribution frame 27 also provides a centralized point for test access and circuit rearrangements.

Figure 4:
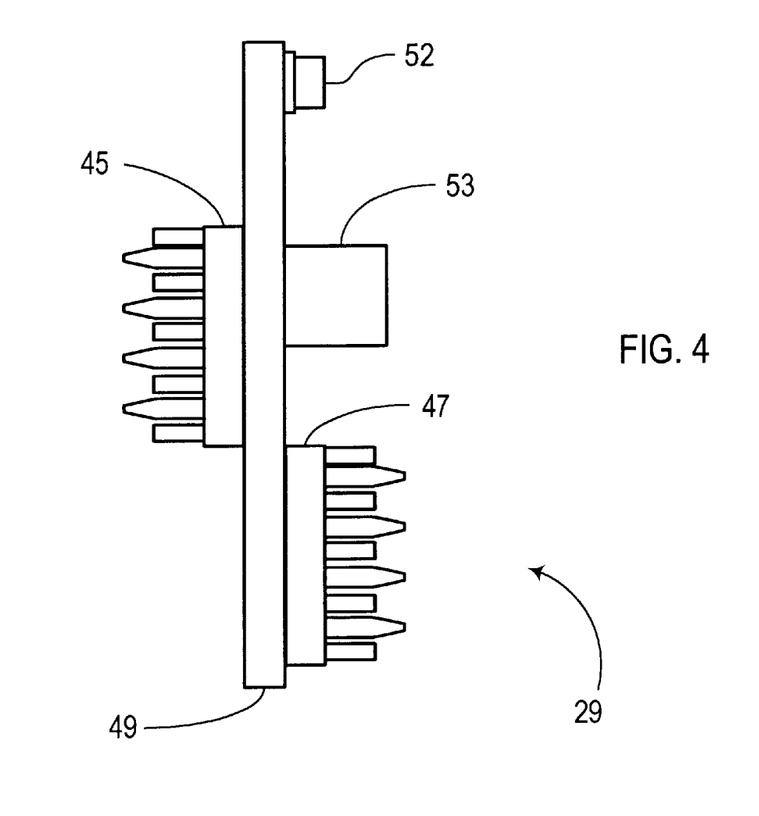
FIG. 4 is a diagram of the cross-connect module 29 in accordance with an embodiment of the present invention.

FIG. 4 shows one embodiment of cross-connect module 29. Two insulation displacement connectors (IDC) 45 and 47 are mounted on a printed circuit board 49. The printed circuit board 49 contains electrical traces such that each pin of the network side IDC 45 is electrically connected through normally closed contacts in the 8-pin modular switching jack 53 to the analogous pin on the cross-connect side IDC 47. An LED switch 52 preferably is also mounted on the printed circuit board 49.

Figure 5:
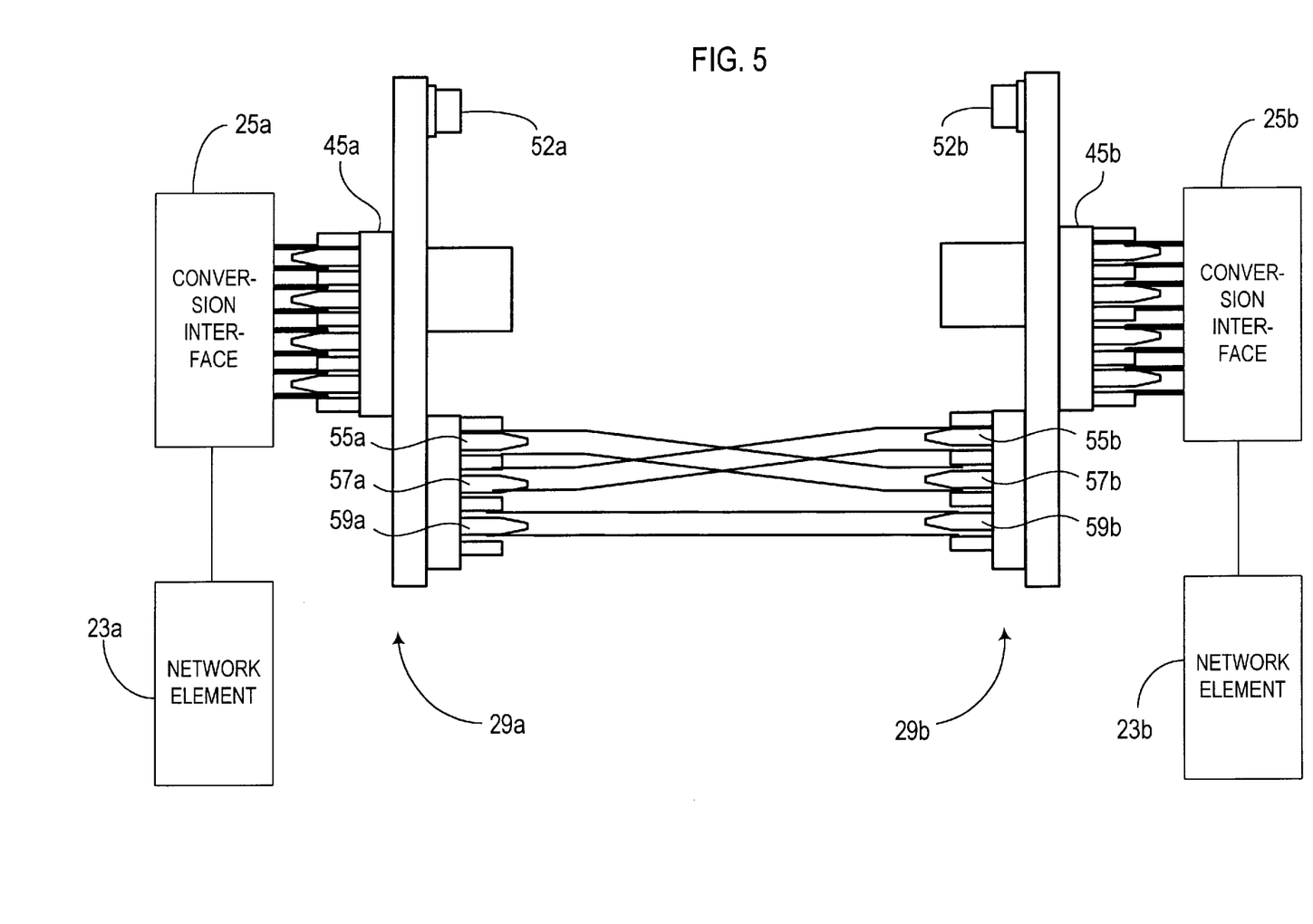
FIG. 5 is a diagram of one use of the cross-connect module 29 in accordance with an embodiment of the present invention, for cross-connecting and tracing PSTN signals.

FIG. 5 shows a possible use of two cross-connect modules 29 for cross-connecting PSTN signals. The network-side IDC 45a of the first cross-connect module 29a is electrically connected to a media conversion module 25a, which is in turn electrically connected to first network element 23a. The network side IDC 45b of the second crossconnect module 29b is electrically connected to a media conversion module 25b, which is in turn electrically connected to second network element 23b. The transmit pin(s) 55a of the cross-connect side IDC of the first cross-connect module 29a is electrically connected to the receive pin(s) 57b of the cross-connect side IDC of the second cross-connect module 29b. Similarly, the receive pin(s) 57a of the cross-connect side IDC of the first cross-connect module 29a is electrically connected to transmit pin(s) 55b of the cross-connect side IDC of the second cross-connect module 29b. When the pins are so connected, the signal carried by first network element 23a is tied to the signal carried by second network element 23b, creating a live circuit.

Tracing can also be performed by electrically connecting the tracing pins(s) 59a of the cross-connect side IDC of the first cross-connect module 29a to the tracing pin(s) 59b of the cross-connect side IDC of the second cross-connect module 29b. When either of the LED switches 52a or 52b is closed, the two LEDs will light if continuity is established between the two cross-connect modules 29a and 29b. In normal usage, only one bconnection between tracing pin 59a and 59b is used, although two are shown for completeness.

Figure 6:
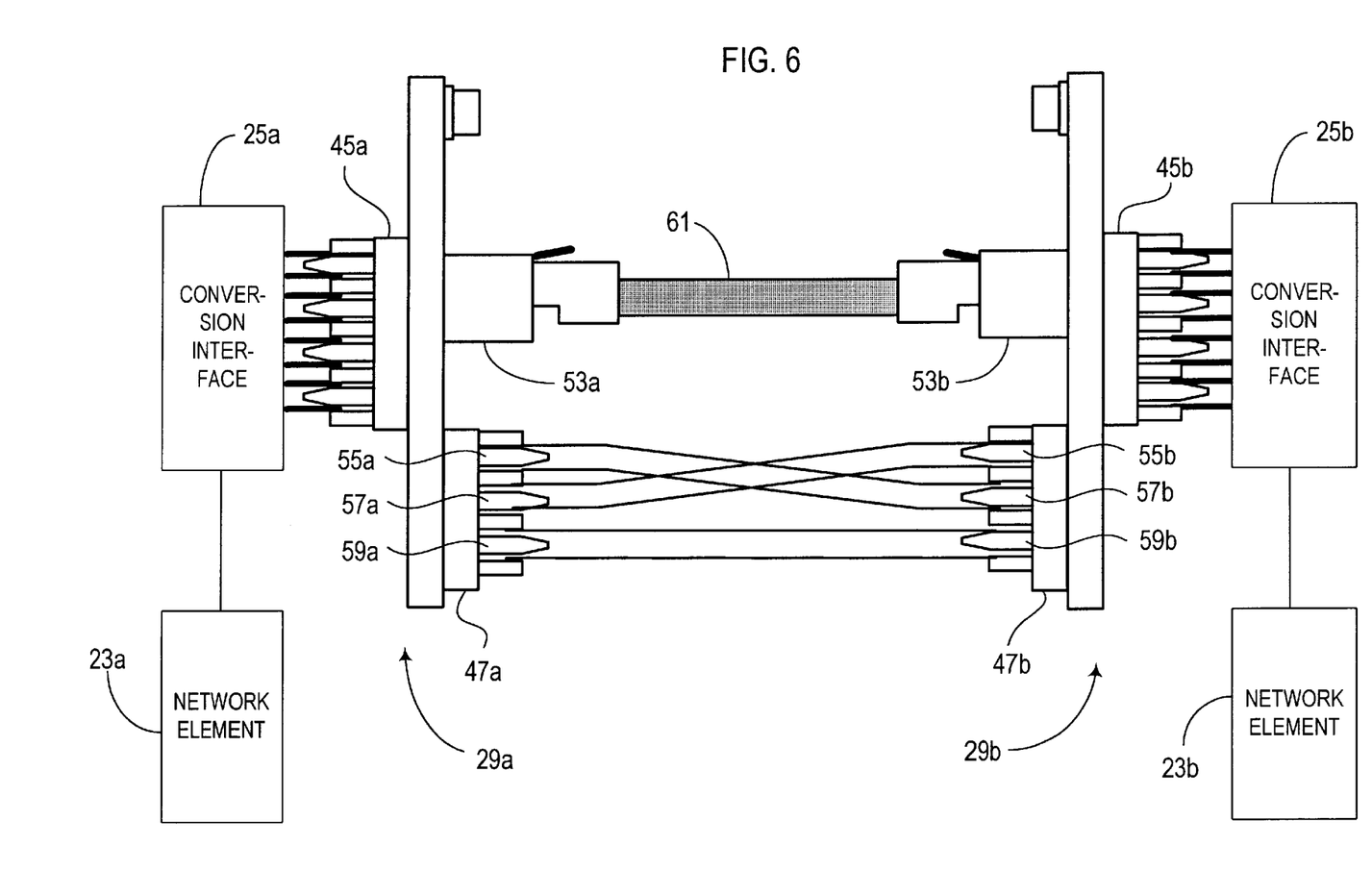
FIG. 6 is a diagram of one use of the cross-connect module 29 in accordance with an embodiment of the present invention, for patching PSTN signals.

FIG. 6 shows how an embodiment of the present invention supports temporary patching of a PSTN signal without removing any of the cross-connections between the transmit and receive pins 55a and 57b, 57a and 55b. When one end of a patch cable 61 is inserted into the modular jack 53a of the first cross-connect module 29a, and the other end into the modular jack 53b of the second cross-connect module 29b, all electrical connections between the network side IDC 45a/45b and the cross-connect side IDC 47a/47b are disabled, and the PSTN signal is carried over the patch cable 61 instead. The present invention also supports monitoring of a PSTN signal, through use of a specialized cord that connects over the top of IDC 47a or IDC 47b.

Figure 7:
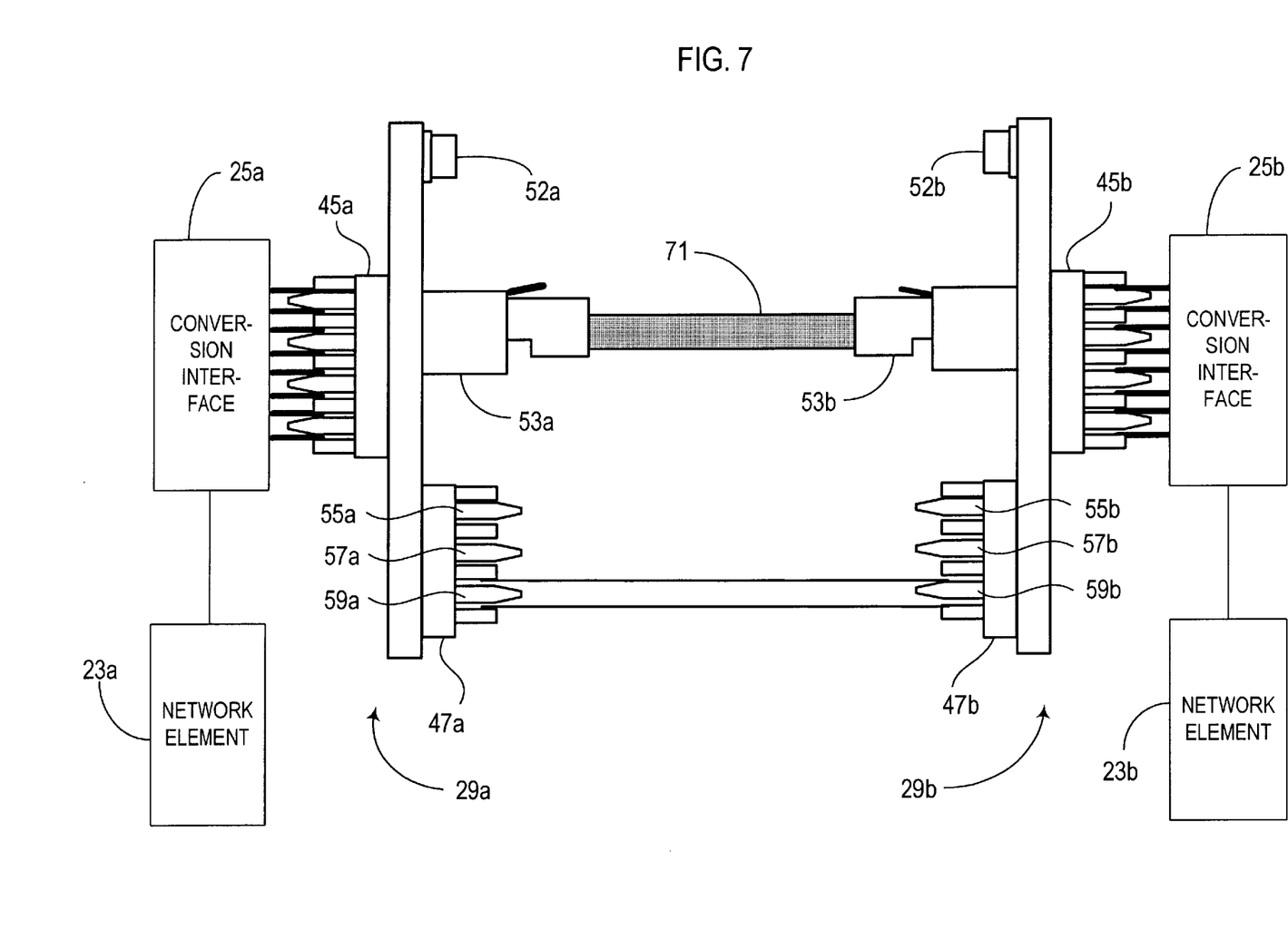
FIG. 7 is a diagram of another use of the cross-connect module 29 in accordance with an embodiment of the present invention, for cross-connecting and tracing data signals.

FIG. 7 shows a possible use of two cross-connect modules 29 for cross-connecting data signals. The network-side IDC 45aof the first cross-connect module 29a is electrically connected to a media conversion module 25a, which is in turn electrically connected to first network element 23a. The network-side IDC 45b of the second cross-connect module 29bis electrically connected to a media conversion module 25b, which is in turn electrically connected to second network element 23b. When one end of a cross-connect cable 71 is inserted into the modular jack 53a of the first cross-connect module 29a, and the other end into the modular jack 53b of the second cross-connect module 29b, the data signal carried by first network element 23a is tied to the data signal carried by second network element 23b, creating a live circuit. The cross-connect cable 71 swaps the transmit wire(s) with the receive wire(s), and vice-versa.

Tracing can also be performed by electrically connecting the tracing pin(s) 59a of the cross-connect side IDC 47a of the first cross-connect module 29a to the tracing pin(s) 59b cross-connect side IDC 47b of the second cross-connect module 29b. When either of the LED switches 52a or 52b is closed, the two LEDs will light if continuity is established between the two cross-connect modules 29a and 29b. In normal usage, only one connection between tracing pin 59a and 59b is used, although two are shown for completeness.

Figure 8:
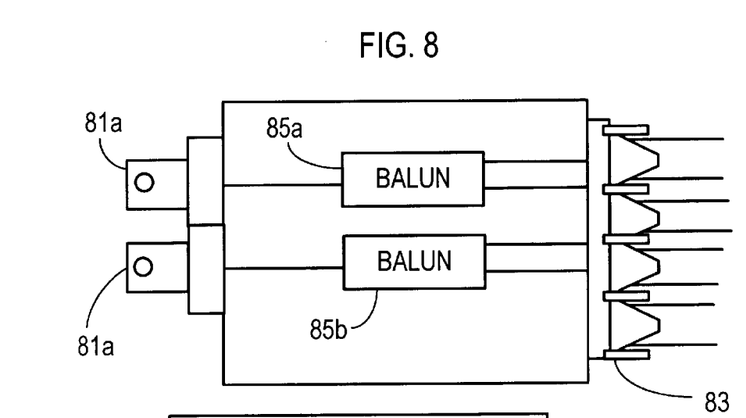
FIGS. 8–14 are diagrams of various embodiments of the media conversion interface shown in FIG. 2.
Figure 9:
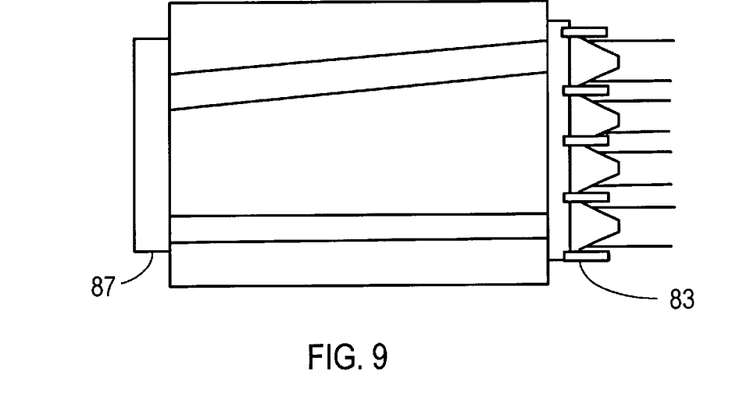
Figure 10:
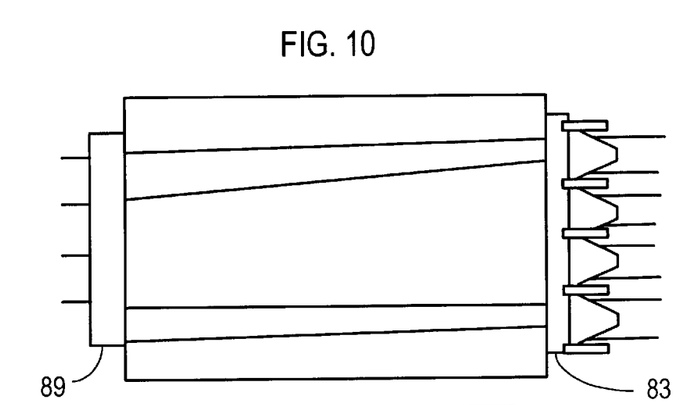
Figure 11:
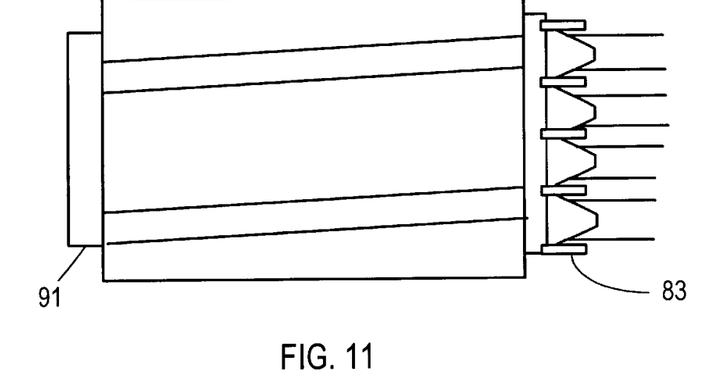
Figure 12:
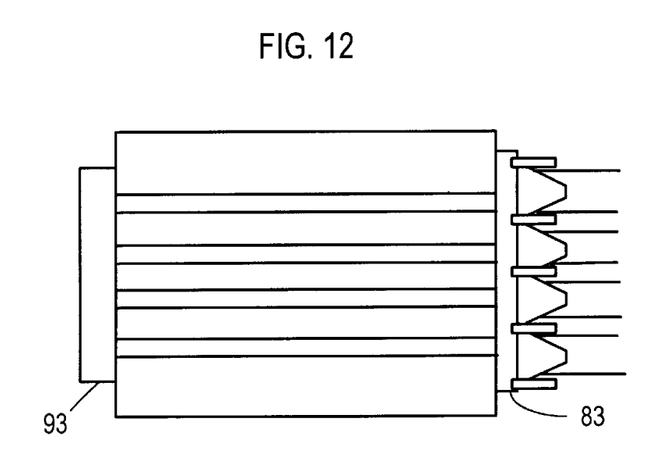
Figure 13:
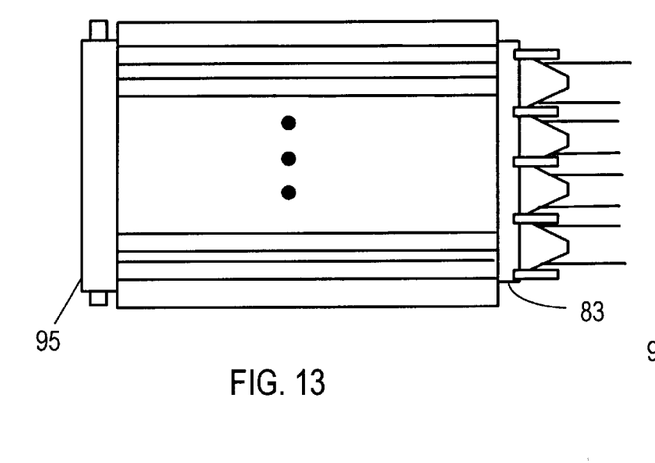
Figure 14:
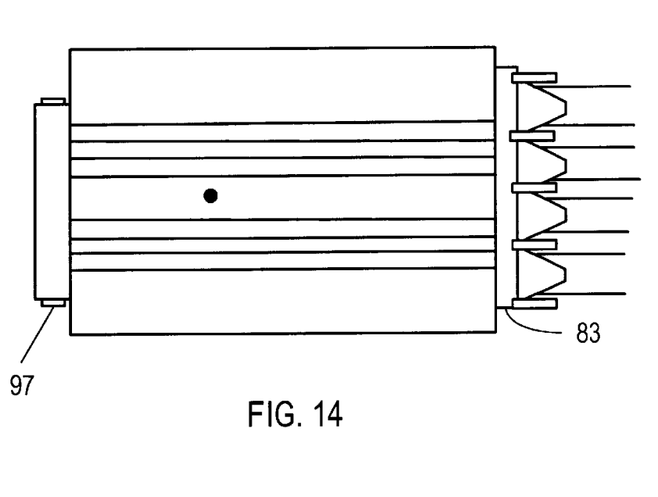

FIGS. 8 through 14 show various embodiments of the media conversion interface 25. FIG. 8 shows the pin-out of a plurality of coax connectors 81a–81b on the network side mapped to the pin-out of an IDC 83 on the cross-connect-side, using a plurality of baluns 85a–b to connect the balanced side of the network to the unbalanced side. FIG. 9 shows the pin-out of an 8-pin modular connector for 10M or 100M Ethernet 87 on the network side mapped to the pin-out of an IDC 83 on the cross-connect-side. FIG. 10 shows the pin-out of a wire-wrap connector 89 on the network side mapped to the pin-out of a IDC 83 on the cross-connect-side. FIG. 11 shows the pin-out of a RJ-48 connector 91 on the network side mapped to the pin-out of an IDC on the cross-connect-side. FIG. 12 shows the pin-out of an 8-pin modular connector for 1 Gb Ethernet 93 on the network side mapped to the pin-out of an IDC 83 on the cross-connect-side. FIG. 13 shows the pin-out of an HSSI connector 95 on the network side mapped to the pin-out of an IDC 83 on the cross-connect-side. FIG. 14 shows the pin-out of a DB15 connector 97 on the network side mapped to the pin-out of an IDC 83 on the cross-connect-side.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A system for cross-connecting network elements of different types through a common universal media, the different types comprising at least a first type, a second type and a third type, the system comprising:
   a first media conversion interface that maps a signal received from a first network element, the first network element being selected from the first type, the second type and the third type, to a universal connector of said first media conversion interface;
   a first cross-connect module coupled to said first media conversion interface, the first cross-connect module receiving the mapped signal from the first media conversion interface at a universal connector of said first cross-connect module;
   a second cross-connect module coupled to said first cross-connect module, the second cross-connect module receiving a signal from the first cross-connect module, the signal received from the first cross-connect module being associated with the mapped signal; and
   a second media conversion interface coupled to the second cross-connect module and to a second network, wherein said second media conversion interface maps a signal received from the second cross-connect module to a connector of said second network element.

2. The system of claim 1, wherein said first cross-connect module is coupled to said first media conversion interface by a universal media cable group, the universal media cable group comprising cables having first ends connected to universal connectors of said first media conversion interface and second ends connected to universal connectors of said first cross-connect module, and wherein said second cross-connect module is coupled to said second media conversion interface by a universal media cable group comprising cables having first ends connected to universal connectors of said second media conversion interface and second ends connected to universal connectors of said second cross-connect module, and wherein said second cross-connect module is coupled to said first cross-connect module by a universal media cable group comprising cables having first ends connected to universal connectors of said first cross-connect module and second ends connected to universal connectors of said second cross-connect module.

3. The system of claim 2, wherein said first media conversion interface comprises:
   a network-side connector that matches a connector of said first network element;
   a cross-connect-side universal connector that matches a universal connector of said first cross-connect module; and
   a mapping configuration for passively mapping a pin-out of said network-side connector to a pin-out of said cross-connect-side universal connector.

4. The system of claim 2, wherein at least one of said universal connectors is an insulation displacement connector.

5. The system of claim 2, wherein at least one of said universal media cable groups is category-6 unshielded twisted pair.

6. The system of claim 2, wherein each cross-connect module comprises:
   a printed circuit board;
   a network-side insulation displacement connector mounted on said printed circuit board, the network-side insulation displacement connector being a universal connector; and
   a cross-connect-side insulation displacement connector mounted on said printed circuit board on the side of said printed circuit board opposite the side of said printed circuit board on which said network-side insulation displacement connector is mounted, the cross-connect-side insulation displacement connector being a universal connector, wherein electrical traces on said printed circuit board electrically connect a pin of said network-side insulation displacement connector to an analogous pin of said cross-connect-side insulation displacement connector.

7. The system of claim 6, further comprising:
   an 8-pin modular jack mounted on said printed circuit board such that inserting a connector into said 8-pin modular jack disables electrical signals between said network-side insulation displacement connector and said cross-connect-side insulation displacement connector, and enables electrical signals between said 8-pin modular jack and said network-side insulation displacement connector.

8. The system of claim 6, further comprising:
   a switch mounted on said printed circuit board; and
   an LED mounted on said printed circuit board, wherein closing said switch completes a circuit between said LED and said cross-connect-side insulation displacement connector.

9. The system of claim 3, wherein said network-side connector is an 8-pin modular connector, and wherein said cross-connect-side universal connector is an insulation displacement connector.

10. The system of claim 3, wherein said network-side connector is a wire-wrap connector, and wherein said cross-connect-side universal connector is an insulation displacement connector.

11. The system of claim 3, wherein said network-side connector is an RJ-48 connector, and wherein said cross-connect-side universal connector is an insulation displacement connector.

12. The system of claim 3, wherein said network-side connector is an HSSI connector, and wherein said cross-connect-side universal connector is an insulation displacement connector.

13. The system of claim 3, wherein said network-side connector is a DB 15 modular connector, and wherein said cross-connect-side universal connector is an insulation displacement connector.

14. The system of claim 1 wherein the first type is an ATM switch, the second type is a SONET fiber terminal, and the third type is an IP switch.

15. An apparatus for cross-connecting network elements of different types through a common universal media, the different types comprising at least a first type, a second type, and a third type, the apparatus comprising:
- a first media conversion interface, the first media conversion interface being coupled to a first network, the first network element being selected from the first type, the second type and the third type, wherein said first media conversion interface maps a connector and cable type of said first network element to one of a plurality of universal connectors of said first media conversion interface; and
- a first cross-connect module, the first cross-connect module being coupled to said first media conversion interface by a universal media cable group comprising cables having first ends connected to universal connectors of said first media conversion interface and second ends connected to universal connectors of said first cross-connect module.

16. The apparatus of claim 15, further comprising:
- a second media conversion interface, the second media conversion interface being coupled to a second network element, wherein said second media conversion interface maps a universal connector of said second media conversion interface to a connector and cable type of said second network element; and
- a second cross-connect module, the second cross-connect module being coupled to said second media conversion interface by a universal media cable group comprising cables having first ends connected to universal connectors of said second cross-connect module and second ends connected to universal connectors of said second media conversion interface, and wherein said first cross-connect module is coupled to said second cross-connect module by a universal media cable group comprising cables having first ends connected to universal connectors of said first cross-connect module and second ends connected to universal connectors of said second cross-connect module.

17. The apparatus of claim 15, wherein said first media conversion interface comprises:
- a network-side connector, that matches the connector of said first network element;
- a cross-connect-side universal connector that matches a universal connector of said first cross-connect module; and
- a mapping configuration that passively maps a pin-out of said network-side connector to a pin-out of said cross-connect-side universal connector.

18. The apparatus of claim 15, wherein at least one of said universal connectors is an insulation displacement connector.

19. The apparatus of claim 15, wherein at least one of said universal media cable groups is category-6 unshielded twisted pair.

20. The system of claim 15 wherein the first type is an ATM switch, the second type is a SONET fiber terminal, and the third type is an IP switch.

21. A method for cross-connecting network elements of different types through a common universal media, the different types comprising at least a first type, a second type, and a third type, the method comprising the steps of:
- receiving a signal at a first media conversion interface from a first network element, the first network element being selected from the first type, the second type and the third type;
- mapping the signal received at the media conversion interface into a form that is suited to be received by a first cross-connect module;
- receiving the mapped signal at the first cross-connect module, the first cross-connect module being coupled to said first media conversion interface;
- transmitting the mapped signal from the first cross-connect module to a second cross-connect module and from the second cross-connect module to a second media conversion interface; and
- mapping the signal transmitted to the second media conversion interface into a form that is suited to be received by a second network element.

22. The method of claim 21, wherein said first media conversion interface comprises:
- a network-side connector that matches a connector of said first network element;
- a cross-connect-side connector that matches a universal connector of said first cross-connect module; and
- a mapping configuration for passively mapping a pin-out of said network-side connector to a pin-out of said cross-connect-side connector.

23. The method of claim 22, wherein said second media conversion interface comprises:
- a network-side connector that matches a connector of said second network element;
- a cross-connect-side connector that matches a universal connector of said second cross-connect module; and
- a mapping configuration for passively mapping a pin-out of said network-side connector of said second media conversion interface to a pin-out of said cross-connect-side connector of said second media conversion interface.

24. The system of claim 21 wherein the first type is an ATM switch, the second type is a SONET fiber terminal, and the third type is an IP switch.

* * * * *